Patented July 1, 1930

1,768,545

UNITED STATES PATENT OFFICE

THOMAS S. CURTIS, OF HUNTINGTON PARK, LOS ANGELES, CALIFORNIA

CLAY COMPOUND AND METHOD OF MAKING

No Drawing.    Application filed September 5, 1925.  Serial No. 54,826.

The present invention consists of a novel clay composition or compound involving for the larger part a body of clay, as for instance English ball clay, and a special concentrate invented by me and forming a derivative of the known mineral pyrophyllite.

The object in view in the development of the clay compound hereof has been to produce such a compound which will have the special properties of increased strength and toughness, as compared with ordinary ball clay or fire clay of high quality. The clay compound of the invention does not tend to produce vitrification when made into any one of hundreds of fired products for which it is useful.

In addition to the foregoing, a clay compound of this invention possesses highly refractory qualities the increased melting point and rigidity under low or high temperatures being almost in direct proportion to the percentage of the pyrophyllite concentrate which may be added to the clay used.

Another advantage of the clay compound set forth and claimed is that the same has much increased slag resistance, due I believe to the provision in the body of the substance of a skeleton of comparatively insoluble crystals interwoven in the clay mass.

For a full understanding of my invention and its advantages reference may be had to the following detailed description of the manner in which I produce my special composition from the mineral pyrophyllite, and the actual analysis thereof, the said composition being added to the clay in definite proportions stated for giving the best results.

In the carrying out of my invention; the pyrophyllite used as the crude material is mined in rock formation and contains certain impurities that are removed therefrom by my process of treatment. These impurities largely are iron oxide, titanium oxide, lime and magnesia. Were the metallic oxides not removed they would produce discoloration and specks in the final product. The lime and magnesia are undersirable owing to their fluxing influence when the product to be made is for refractory purposes.

By careful microscopic examination on various sized grains produced by crushing rolls and other milling machinery, it has been determined that most of the lime and magnesia of pyrophyllite occur in a clay-like substance which apparently had been deposited in the seams of the ore by water infiltration from above. The iron oxide and titania are found to be present chiefly in a crystalline mineral believed to be tourmaline which is found scattered throughout the ore in small particles. A certain amount of free quartz occurs in the veins but most of this can readily be removed by rough hand sorting.

My process for purification of the ore or pyrophyllite is as follows:

The crude ore in lumps approximately five inches diameter, is charged into a special type of furnace known as the Curtis converter. The operation in this furnace consists in raising the temperature of the fragmentary mass of ore to 1700° F., maintaining this temperature under neutral or slightly reducing combustion conditions for a period of approximately one hour to permit the heat to penetrate throughout the mass, then shutting off the air supply, and passing natural gas through the charge for a period of from four to six hours. By the end of this time the mass will have assumed a barely visible red heat and will have dropped in temperature to about 900° F. At the end of the gas or reducing period, as it is called, the gas is shut off and the converter tilted on its trunnions to dump the charge as quickly as possible in order that it may cool within a matter of minutes to prevent reoxidation of the reduced particles.

The real reduction of the ore commences when the air is shut off at the furnace, and the reduced ore has a slate gray appearance with a beautiful lustre somewhat similar to that of the mineral galena. In fracture it is cubical, quite similar also to galena. In the reduction of the ore, it is essential to avoid overheating the same, for a temperature in excess of 1800° F. tends to produce ferrous silicate, and the latter is entirely non-magnetic and would of course prevent certain magnetic separation to be hereafter described.

The reduced ore is now passed through a jaw crusher and ball mill, or set of rolls, to reduce it to particles ranging from 8 mesh to fines. During the milling operation a strong suction is maintained on the milling apparatus which tends to draw out all very finely divided particles in which practically all of the clay-like substance previously referred to is to be found. This air floated powder constitutes a waste product and is thrown away. It comprises approximately five percent of the total weight charged into the mill. On passing from the mill the remainder, relieved of its impalpable flour, is passed over a 40 mesh screen through which pass the grains rich in free silica or quartz. As the quartz is undesirable the minus 40 product constitutes a second loss of tailings product for which at present we have no use but which may in the future prove of some value. The second tailings product constitutes approximately 15% of the total weight of ore charged into the mill.

The concentrate therefore consists of the 8 to 40 mesh grains which are found to contain very little impurity other than the tourmaline product previously described.

The 8 to 40 mesh concentrate is now passed over a high intensity magnetic separator which removes practically all of the tourmaline and with it of course some particles of attached mineral which do not contain tourmaline. This magnetic separation loss represents about 7% of the weight or ore charged into the mill. The final product therefore comprises about 73% of the original weight of crude ore, which recovery it will be seen, represents a very high one in the light of ordinary concentration operations some of which recover but a few percent of the ore charged into the mill.

The resulting product shows a chemical composition of approximately 52% alumina, 46% of silica and usually less than 2% of combined fluxes such as iron oxide, titania, magnesia and lime. By concentration over the magnetic separator it is possible to eliminate practically all of the remaining impurities but we do not find it necessary or desirable to do this except where a pure white ceramic material must be made.

It is important to observe the relatively large proportion of alumina to silica thus obtained, and care should be exercised in the selection of minerals for treatment according to the present process that are sufficiently rich in alumina to give the proportions recited, amounting almost or approximately to three parts of alumina to two parts of silica. Theoretically perfect pyrophyllite is indicated by the formula $HAl(SiO_3)_2$, the constituents being indicated as 66.7 silica, 28.3 alumina and 5.0 water; but in the selection of the pyrophyllite above referred to, it is obvious that a greater richness of the alumina must be present in situ. It is therefore obvious that the mineral selected for treatment whereby the final product comprises approximately 52% of alumina to 46% silica should be selected because of its richness in alumina rather than because of its classification as pyrophyllite.

The finished product in grain form is next charged into a ball mill or pebble mill or any suitable grinding machine which produces a large percentage of very fine flour and is ground to pass an 80 mesh screen.

The fine powder thus produced forms the finished product ready for use in the ceramic industry.

An exhaustive series of tests under practical commercial working conditions shows that this product imparts certain valuable characteristics to burnt clay wares as hereinbefore outlined, a number of which will be enumerated more specifically and described in detail below.

Mechanical strength

An admixture of 10% of my compound with 90% of English ball clay, made into a briquette, and fired in a ceramic kiln to cone 18 shows a resistance to impact of about 40 to 1 over the fired strength of the English ball clay alone. English ball clay is referred to and used for test purposes, first, because it is a standard ceramic material known to practically all ceramists the world over; and second, because it is one of the strongest bond clays known to the art. It is significant therefore that an addition of but 10% of my compound to this already strong clay should so greatly enhance its toughness. The addition of 50% to English ball clay increases its fired strength approximately 140 times while the addition of 70% to 30% of English ball clay increases the strength 158 times. The significance of this characteristic will be apparent at once when the relation of strength to durability of my burnt clay articles is taken into account, such as for instance ordinary crockery and earthenware, stone ware, white ware, and china, terra cotta building material, bricks and other articles made of burnt clay, practically all of which may be enhanced in strength through the addition of small percentages of my compound.

A clay composition made in accordance with my invention is especially useful for white ware mixtures, as a ladle grout, cupola, patching mud, cement for fire brick, fire brick itself, fire clay, stone ware, crucible and pot clay mixtures, and a hundred other uses in the ceramic arts.

Having thus described my invention what I claim as new and desire to secure by Letters Patent is:

1. The process of making a ceramic composition for increasing the strength of clay products, comprising the combining with clay, of pyrophyllite, the latter being first subjected to heat treatment under reducing conditions, then cooled in a manner to prevent reoxidation, and crushed to assume a finely divided state.

2. The process of making a ceramic composition for increasing the strength of clay products, comprising the combining with clay, of pyrophyllite, the pyrophyllite being first processed as follows: subjected to heat of approximately 1800 degrees F., maintained in substantially this temperature under neutral or reducing conditions for approximately one hour to cause heat to penetrate throughout the mass, the air supply then shut off and natural gas passed through the charge for approximately several hours, the mass gradually cooled to approximately 800 degrees F., the mass then quickly cooled in a manner to prevent reoxidation, and the cooled mass later crushed to finely divided particles for admixture with the clay which is to be later heat treated and converted into articles of ceramic manufacture.

3. The process of making a ceramic composition for increasing the strength of clay products, comprising the combining with clay, of pyrophyllite, the pyrophyllite being first processed as follows: subjected to approximately 1800 degrees F., maintained in substantially this temperature under neutral or reducing conditions for approximately one hour to cause heat to penetrate throughout the mass, the air supply then shut off and natural gas passed through the charge for approximately several hours, the mass gradually cooled to approximately 800 degrees F., the mass then quickly cooled by discharging same quickly from the heat treating means so it may cool within a matter of minutes to prevent reoxidation of the reduced particles, and the cooled mass being crushed to reduce it to particles ranging approximately from 8 mesh to fines, and impurities being separated out of the crushed mass so that in such condition it may be admixed with the clay with which it is later to be heat treated and thus converted into ceramic products.

4. The process of making a ceramic composition for increasing the strength of clay products, comprising the combining with clay, of pyrophyllite, the pyrophyllite being first processed as follows: subjected to heat reducing conditions at a temperature of approximately 1800 degrees F., cooled under non-oxidizing conditions, and crushed into a finely divided state.

In testimony whereof I affix my signature.

THOMAS S. CURTIS.